Jan. 1, 1924. 1,479,308
A. MAAKE
WINDOW FOR VEHICLE CURTAINS
Filed June 29, 1922
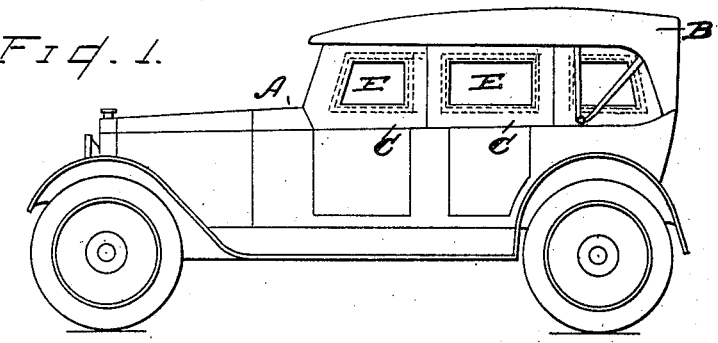
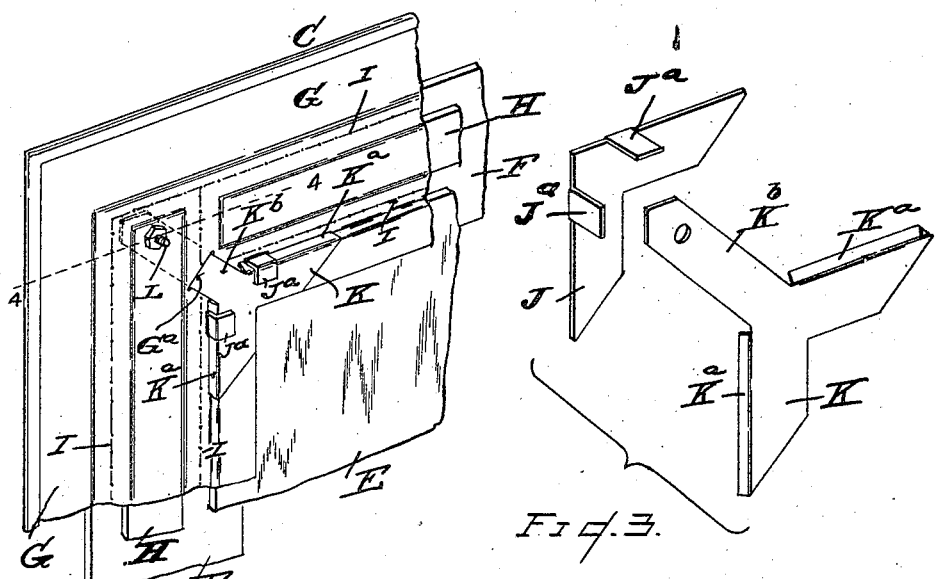
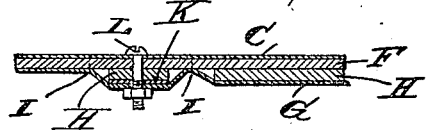
Inventor
Arthur Maake
By S. E. Thomas
Attorney Patented Jan. 1, 1924.

1,479,308

UNITED STATES PATENT OFFICE.

ARTHUR MAAKE, OF DETROIT, MICHIGAN.

WINDOW FOR VEHICLE CURTAINS.

Application filed June 29, 1922. Serial No. 571,733.

*To all whom it may concern:*

Be it known that I, ARTHUR MAAKE, citizen of the United States, residing at Detroit, county of Wayne, State of Michigan, have invented a certain new and useful Improvement in Windows for Vehicle Curtains, and declare the following to be a full, clear, and exact description of the same, such as will enable others skilled in the art to which it pertains to make and use the same, reference being had to the accompanying drawings, which form a part of this specification.

My invention relates to windows for vehicle curtains shown in the accompanying drawings and more particularly described in the following specification claims.

It is well known that the usual transparent celluloid sheet employed for windows of motor vehicles is unsatisfactory due to the fact that it soon becomes dull and brittle and is easily broken, and for these and other reasons sheet glass is now being rapidly introduced in its place. Difficulty however has been found in providing suitable supporting means for securing the glass in the curtain which if not properly held soon becomes loose and is easily fractured due to the vibration of the vehicle.

It is essential however that the supporting frames should be light, strong and rigid and that the construction be such that the glass is secured so that it will not become loose and rattle in the supporting frame.

It is therefore one of the objects of the present invention to provide a suitable device secured to the curtain and to the supporting frame adapted to engage each of the corners of the glass that it may be held against rattling or lateral movement.

With the foregoing and other objects in view which will appear as the description proceeds the invention further resides in the combination and arrangement of parts and in the detail of construction hereinafter described and claimed it being understood that changes may be made in the embodiment shown in the drawings without departing from the spirit of the invention.

Figure 1 is a side elevation of an automobile with its side curtains in position.

Figure 2 is a fragmentary perspective view of one of the curtains showing the corner member in position.

Figure 3 is a perspective view of the co-operating plates comprising the corner member detached from the curtain and in disconnected relation to each other.

Figure 4 is a detail sectional view taken on or about line 4—4 of Figure 2.

Referring now to the letters of reference placed upon the drawings:—

A, denotes an automobile, B its top and C its side curtains secured to each other and to the automobile top by suitable grommets not shown, E denotes a sheet of glass having its marginal edge adjacent the marginal edge of the frame F in turn supported between the curtain C, and its lining G, to which it is cemented.

H, are reinforcing strips overlapping the frame F, secured against displacement by lines of stitches I, extending through the curtain, frame and lining on each side of the reinforcing strips. J denotes one plate of a corner member adjacent to the outer face of the glass and beneath the curtain, having laterally extending lugs $J^a$, $J^a$, adapted to be bent to overlap the edges and grip the face of the co-acting plate K, of the corner member. The plate K of the corner member is placed adjacent the inner face of the glass and over the lining, its marginal edges $K^a$ being bent at right angles to the body portion of the member so as to overlap the edges of the glass. The plate K is also provided with a projecting tongue $K^b$, extending outwardly from the corner and through a slit $G^a$ in the lining so as to overlap the frame and reinforcing strips H, to which it is secured by a bolt L, extending through the frame, reinforcing strips, curtain and lining, see Figure 4 of the drawing.

It will be readily seen that the corner members will serve to secure the glass against rattling, or lateral movement, and when necessary to replace the glass it may be readily done at a minimum expense.

Having thus described my invention what I claim is:—

1. In a device of the character described, the combination of a curtain provided with a window opening, a window frame secured to the curtain, a sheet of glass fitted to the frame, a plurality of corner members comprising two co-operating plates spaced apart to receive the corners of the glass, one of said plates having flanges adapted to overlap the edges of the glass and also a projecting tongue provided with an aperture for the passage of a bolt, one of said plates having also a plurality of lugs adapted to be bent to overlap its co-operating plate, whereby the glass may be secured between the plates of the corner members, and a bolt extending through the tongue and window frame to secure the glass against displacement.

2. In a device of the character described, the combination of a curtain provided with a window opening; a window frame secured to the curtain; means for reinforcing said window frame; a plurality of corner members comprising two co-operating plates adapted for receiving between them the corners of the glass, one of said plates having flanges overlapping the edge of the glass and also a tongue provided with an aperture for the passage of a bolt, said plates being also provided with lugs adapted to overlap their co-operating plates, whereby the glass may be held between the plates of the corner members, and a bolt extending through the tongue, window frame, and reinforcing members of the window frame.

3. In a device of the character described, the combination of a curtain provided with a window opening, a frame for the curtain and reinforcing strips therefor, corner plates adapted to receive a window panel comprising angle members, one of the said plates having marginal flanges extending at right angles thereto to engage the edges of the window panel and having a tongue thereon provided with an opening, the other plate having lugs thereon overlapping the first mentioned plate and forcing the flanges against the edges of the window panel and means for securing the tongue to the reinforcing strip, frame and curtain.

4. In a device of the character described, comprising a curtain formed with a window opening, a frame secured to the curtain and a lining stitched to the frame and curtain to form a pocket, cooperating plates at each corner of the window opening to receive a window panel therebetween, one of the plates having a flange to engage the edge of the window panel and being provided with a tongue, the other plate having lugs to overlap its companion plate, the said lining having a slot therein to receive the tongue, a reinforcing strip within the pocket and a bolt passing through the tongue, reinforcing strip, frame and curtain for securing the same together.

In testimony whereof, I sign this specification in the presence of two witnesses.

ARTHUR MAAKE.

Witnesses:
S. E. THOMAS,
JOHN CONSIDINE.